(12) United States Patent
Hungerbuehler et al.

(10) Patent No.: US 6,333,708 B1
(45) Date of Patent: Dec. 25, 2001

(54) DATA ACQUISITION SYSTEM COMPRISING A CIRCUIT FOR CONVERTING A HIGH-FREQUENCY ANALOG INPUT SIGNAL INTO A PLURALITY OF DIGITAL SIGNALS

(75) Inventors: Viktor M. Hungerbuehler, Satigny; Bernard Mauron, Chambesy, both of (CH)

(73) Assignee: Acquiris, Plan-les-Quates (CH)

( * ) Notice: Subject to any disclaimer, the term of this patent is extended or adjusted under 35 U.S.C. 154(b) by 0 days.

(21) Appl. No.: 09/712,094

(22) Filed: Nov. 14, 2000

Related U.S. Application Data

(63) Continuation of application No. PCT/CH98/00377, filed on Sep. 2, 1998.

(30) Foreign Application Priority Data

May 18, 1998 (EP) .................................................. 98810452

(51) Int. Cl.[7] .................................................. H03M 1/12
(52) U.S. Cl. .................................................. 341/155; 341/161
(58) Field of Search .................................................. 341/155, 161, 341/159, 160, 158

(56) References Cited

U.S. PATENT DOCUMENTS

| | | |
|---|---|---|
| 5,397,981 | 3/1995 | Wiggers . |
| 5,428,357 | 6/1995 | Haab et al. . |
| 5,557,800 | 9/1996 | Kasimov et al. . |
| 5,856,800 * | 1/1999 | Le Pailleur .......................... 341/159 |
| 6,166,673 * | 12/2000 | Odom .................................. 341/155 |

FOREIGN PATENT DOCUMENTS 0 629 966 A1   12/1994   (EP) .

* cited by examiner

*Primary Examiner*—Brian Young
(74) *Attorney, Agent, or Firm*—Pearne & Gordon LLP

(57) ABSTRACT

Data acquisition system comprising a circuit for converting a high-frequency analog input signal (a) into a plurality of digital signals ($D_1$–$D_N$, R) for processing by a digital processing system including at least one digital processor (8) comprising a m-bits digitizer (1), a demultiplexer (2) for delivering in parallel N m-bits sample values supplied in series by said digitizer (1), and a memory (5) for storing the demultiplexed sample values, said memory (5) being accessible by said digital processing system (8).

Figure 1:
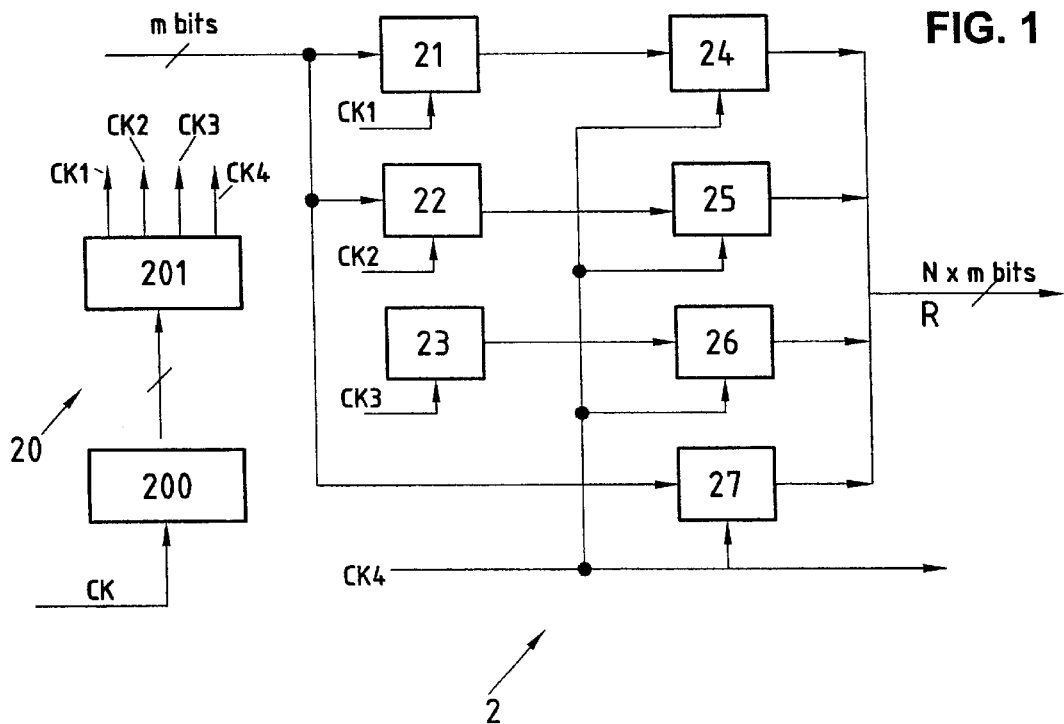

According to the invention, the circuit further comprises a real time digital processing circuit (6) for processing in real time said demultiplexed sample values, capable of supplying processed results to said digital processing system (8). The sampling frequency of said digitizer (1) is greater than the input frequency of said digital processor (8).

16 Claims, 3 Drawing Sheets

DATA ACQUISITION SYSTEM COMPRISING A CIRCUIT FOR CONVERTING A HIGH-FREQUENCY ANALOG INPUT SIGNAL INTO A PLURALITY OF DIGITAL SIGNALS

This application is a continuation based on international application PCT/CH98/00377 (WO99/60494), filed on Sep. 2, 1998, and claiming priority of the unpublished application EP98810452.7 of May 18, 1998, whose contents are hereby incorporated by way of reference.

The international applications PCT/CH99/00153 (WO99/60495) and PCT/CH99/00154 (WO99/60496), whose contents are hereby incorporated by way of reference, claim priority of the same application EP98810452.7.

FIELD OF THE INVENTION

The present invention concerns a data acquisition system comprising a circuit for converting an input analog signal into a plurality of digital signals. The present invention concerns in particular a data acquisition system comprising a conversion circuit supplying digital signals for processing by a digital processor in a data acquisition system.

RELATED ART

Many types of data acquisition systems are known, for example transitory recorders and digital oscilloscopes, in which it is necessary to convert one or several analog signals into one or several digital signals capable of being stored in a digital memory and processed by a digital processor. These systems comprise generally an input stage constituted of one or several digitizers and of a memory for digitized data; the processor accesses said memory most often through a bus. In low-frequency systems, this memory can for example be constituted directly by the RAM of a computer. The digitized data are stored in this memory and processed, for example displayed, by the processor of this computer either in real time or later, for example when all the data have been acquired.

More and more often in electronic technology, very high frequency analog signals requiring very fast acquisition systems, for example oscilloscopes, are used. Digitizers are currently made that work with a sampling frequency greater than 500 MHz, for example on the order of 1 GHz or more; it is to be predicted that these current limits will be exceeded with the appearance of better performing components. These digitizers permit by virtue of the Nyquist principle to supply an unambiguous digital representation of analog signals having a maximum frequency of several hundred MHz.

These ultra-fast digitizers supply a digital word, for example a byte in the case of eight bit converters, at each flank of the sample signal, for example each nanosecond; the digital output frequency generated is thus extremely high, and generally incompatible with the maximum write access frequency of the usual memory circuits. One thus knows the utilization of demultiplexers, which make it possible in a data acquisition system to supply in parallel N words delivered in series by a digitizer. The output frequency of the demultiplexer is divided by N, at a price of an increase by this same factor of the width of the data bus. The demultiplexer thus allows the requirements as to the speed of memory access to be reduced and several words supplied in series by the digitizer to be delivered in parallel.

FIG. 1 illustrates an example of an embodiment of a demultiplexer with a demultiplexing factor N of 4. It comprises a clock signal generator 20 and the demultiplexer itself.

The clock signal generator 20 comprises a 2 bits counter 200 that counts the ascending and/or descending flanks of the sample signal CK used by the digitizers. The two bits supplied by the counter 200 are converted by the 4-line decoder 201 into four signals CK1 to CK4 that are phase-shifted by 90° and whose frequency is $1/N=¼$ of that of the sample signal CK.

In the demultiplexer itself, the digital words of m bits supplied by the digitizers to the respective ascending flanks of CK1, CK2 and CK3 are stored in respective m bits registers 21, 22, 23. At the ascending flank of CK4, the word supplied by the digitizer is recorded in the register 27, and simultaneously the contents of the registers 21 to 23 is copied into the respective registers 24 to 26; the registers 24 to 27 thus supply in parallel, and until the next ascending flank of CK4, N=4 words delivered in series by the digitizer. The demultiplexer 2 thus allows a stream of words of m bits to be converted into another stream of words of N×m bits with an output frequency N times weaker, and thus compatible with the writing speeds of available memory components.

When the stream of data to be analyzed is continuous, or very long, it is not possible to store it entirely in a memory at an acceptable cost: it is thus necessary for the digital processor to access the data stored by the digitizer in real time. The processing of the stored data can comprise a large number of different operations according to the application, for example an error check, a detection of minima and of maxima, a storage in a permanent memory and a display on a monitor for example.

The external input frequencies of current digital processors are comparable to the maximum output frequencies of the aforementioned digitizers. In the particular case where these frequencies are equal, and if the demultiplexer factor N equals four, the digital processor has only four cycles to access four stored words and to process these four words. Therefore only relatively simple processing operations can be effected in real time. A choice of demultiplexing factor N greater than four requires an increase of the width of the storing memory as well as of the microprocessor's data bus, and thus causes an important increase of the costs.

A purpose of the present invention is to remedy these inconveniences and to extend the possibilities of real-time processing and analyzing of high-frequency digital data in a data acquisition system.

BRIEF SUMMARY OF THE INVENTION

According to the invention, these purposes are achieved by means of a data acquisition system comprising a circuit for converting a high-frequency analog input signal into a plurality of digital signals for processing by a digital processing system including at least one digital processor comprising a real-time digital processing circuit for processing in real time data delivered by the demultiplexer, for processing data during their storage and supplying processed results to said digital processor.

This real-time digital processing circuit processes directly the digital data available at the output of the demultiplexer and supplies results to the digital processor, for example additional signals or data derived from the multiplexer's data. The digital processor in this manner is freed from the data processing operations that can be effected by real-time processing means.

Advantageously, the operation parameters of the real-time digital processing circuit can be defined with parameters or even completely determined or programmed by the digital processor; a great flexibility is thus achieved, and it is possible to effect a different processing according to the application without modifying the physical configuration of the circuit.

U.S. Pat. No. 5,526,301 describes a data acquisition system comprising a sampler and analog processing means of the sampled signal. This document however concerns a purely analog processing circuit; no memory or storing element is further provided for storing the sampled signal.

The invention will be better understood with the aid of the description of an embodiment of the invention given as example and illustrated by the figures showing:

FIG. 1 a bloc diagram of a 4-times demultiplexer, already described here above.

Figure 2:
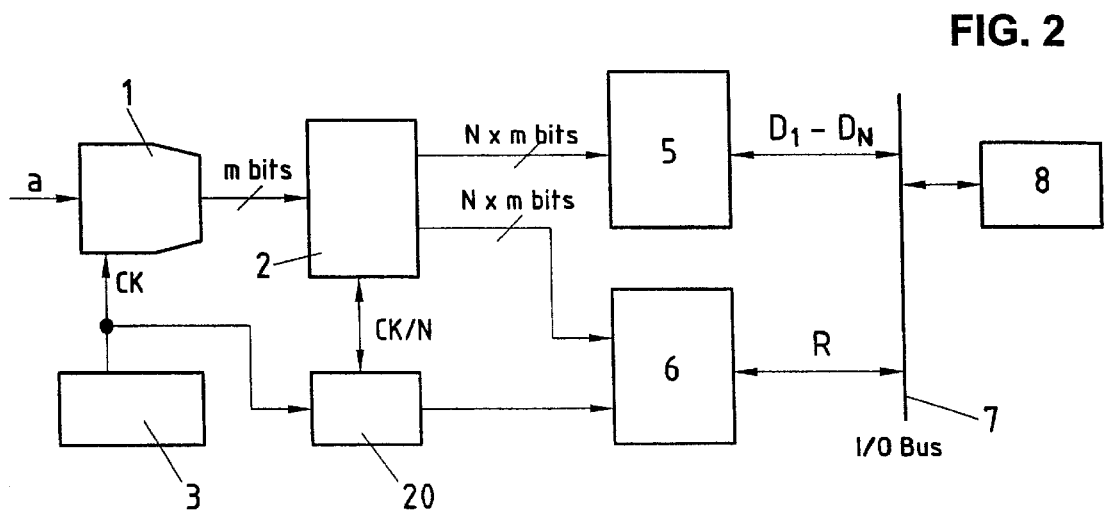

FIG. 2 a bloc diagram of a circuit for converting a high-frequency analog input signal into a plurality of digital signals according to the invention.

Figure 3:
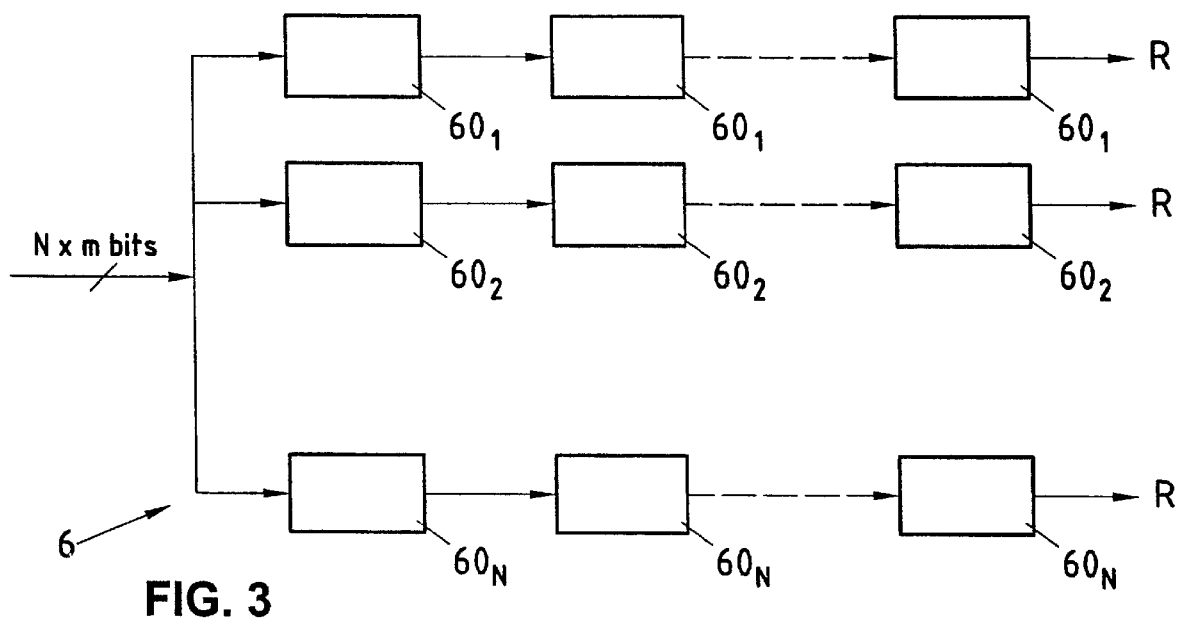

FIG. 3 a bloc diagram of a first embodiment of a real-time processing circuit, based on N series of processors for processing signals in parallel.

Figure 4:
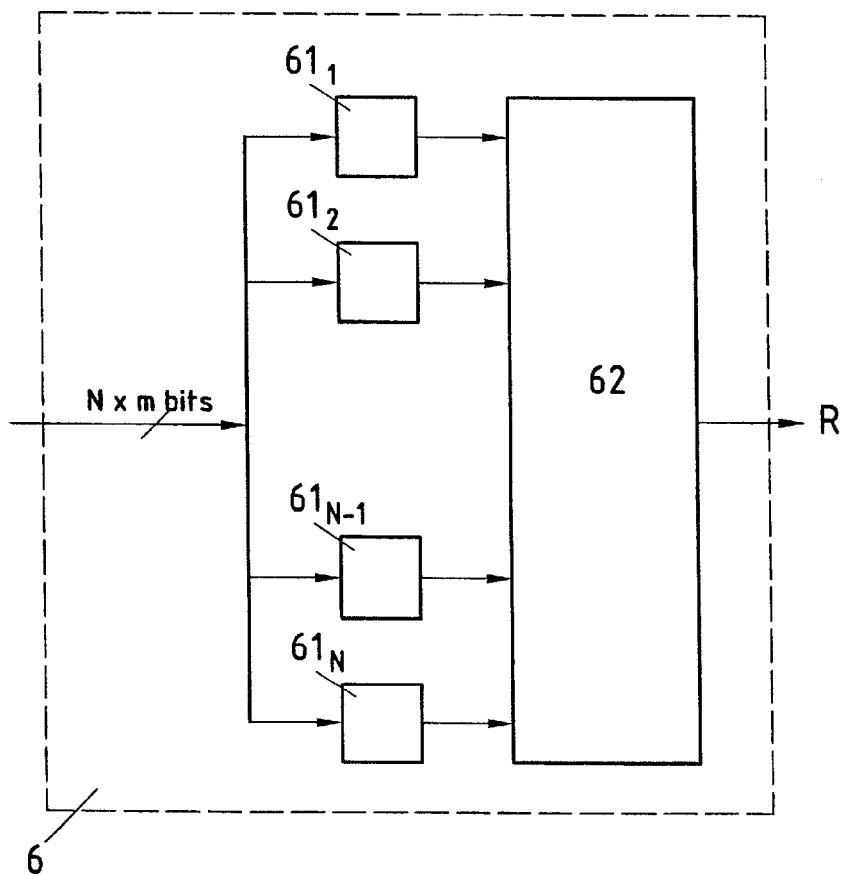

FIG. 4 a bloc diagram of a second embodiment of a real-time processing circuit, based on a gate array.

Figure 5:
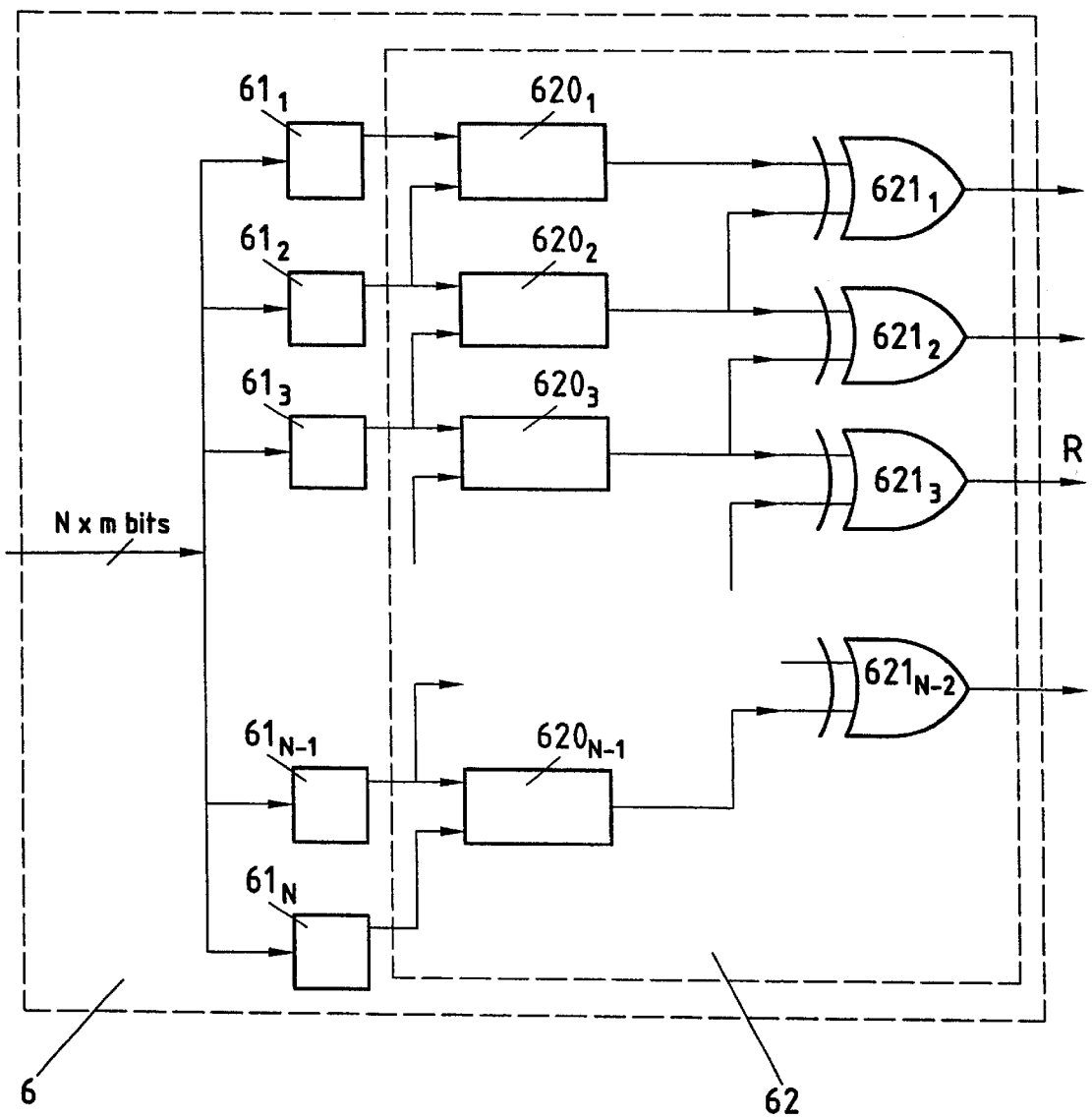

FIG. 5 a bloc diagram of examples of embodiments of a real-time processing circuit, implementing an extrema detector by means of a field programmable gate array (FPGA).

DETAILED DESCRIPTION OF THE INVENTION

Although the circuit of the invention is particularly designed to be used as an input stage in an oscilloscope, notably in a high-frequency digital oscilloscope, or in a transitory recorder, the one skilled in the art will understand that this circuit can also be used in any high-frequency data acquisition system, in particular when the sampling frequency of the digitizer or digitizers is equal to, or greater than, the external bus frequency of the digital processor.

FIG. 2 illustrates a bloc diagram of the whole conversion circuit according to the invention. This circuit is intended for use in a data acquisition system of a known type. At least one analog signal a to be analyzed is converted into a digital signal b by at least one digitizer 1 of a known type. The digitizer 1 comprises preferably a sample-and-hold stage and an analog-to-digital converter mounted in series. The digitizer 1 supplies at each sampling time, determined by a clock signal CK supplied by the clock generator 3, a sampled value corresponding to the instant value of the analog signal a. In order for this analog signal a to be represented unambiguously by the digital signal b, the digitizer 1 must use a sampling frequency at least equal to the Nyquist frequency, i.e. a frequency at least equal to the double of the maximum frequency of the analog signal. If the circuit is intended to analyze the signals of several hundreds of MHz, one will thus preferably choose a sampling frequency greater than 500 MHz, preferably greater than 1 GHz. In an embodiment not represented, it is also possible to use in the framework of this invention several digitizers supplying interlaced digital samples, in order to increase the possible sampling frequency with a given type of digitizer.

The resolution of the digitizer 1 depends on the needs of the specific application; in many high-frequency applications, a digitizer with a relatively low resolution, supplying sampled values coded for example with a number of bits m of 8, 10 or 12, is sufficient, the invention being however not limited to these values of m.

The digitizer 1 supplies at each sampling time a word of m bits, for example 8 bits every nanosecond. The corresponding frequency is greater than the maximum writing frequency of the usual RAM, so that in order to store these data in a RAM 5, it is generally necessary to demultiplex them by means of at least one demultiplexer 2. An example of known demultiplexer has already been described here above in relation to FIG. 1; in the case of a demultiplexer with a ratio N equal to four, it enables the output frequency to be divided by four, the invention being however not limited to this particular value of N. These demultiplexed data are stored in at least one RAM 5, the storing address being determined by an address counter, not represented. A digital processing system, comprising at least one digital processor 8, then accesses the stored data $D_1$–$D_N$, preferably through a bus 7, and according to the algorithm executed effects different operations of processing, analyzing, storing and/or displaying these data on a display, not represented.

The RAM 5 can be constituted of any type of dynamic or preferably static memory, comprising one or several discrete modules arranged according to any appropriate schema. In a preferred embodiment of the invention, the memory 5 is a double access memory enabling the digital processing system 8 to access the data stored while the demultiplexer 2 writes new data. Preferably, the digital processing system can further access the address counter, not represented, to modify the address at which the demultiplexed data are written or to modify the organization of this memory by organizing for example one or several segments within this memory.

According to the invention, the conversion circuit comprises at least one digital real-time processing circuit 6 connected directly at the output of the demultiplexer 2 and capable of effecting a real-time processing of the data supplied by the latter. The digital circuit 6 is synchronized by the signals supplied by the clock generator 20; the demultiplexed data are processed in parallel to their storage in the memory 5. Different embodiments of a processing circuit 6 will be seen further below, corresponding to the different processing operations effected on the demultiplexed data. The digital processing circuit 6 supplies a processed digital result R to the digital processing system. The digital result R can include, according to the application and the processing effected, for example a single bit, for example an error detection bit or a bit indicating a particular situation in the digital data, for example a zero or maximum detection bit. This bit can for example be supplied on a data line of the bus 7, or in a variant embodiment also be directly connected to a material interruption line of the digital processor 8 or of another component of the digital system. In a variant embodiment, the digital processing circuit can also supply a result R over more than one bit, for example over one or several bytes, accessible at a predetermined address on the bus 7. The result R can for example include data of semi-static type and indicate for example a semi-permanent state of the digital data; in a variant embodiment, the digital processing circuit 6 can also supply a result R comprising a continuous stream of data, for example at the same rate as the demultiplexer's data. The processing circuit 6 can for example effect a real-time filtering or averaging of the digital data.

It is also possible in the framework of this invention to provide several circuits 6 connected in parallel, effecting different processing operations on the demultiplexed data and supplying different results R1, R2 etc. at different addresses on the bus 7. For example, it is possible to provide a circuit effecting a detection of extrema, a second circuit effecting a detection of zero crossover, a third circuit effecting a real-time data filtering etc.

The digital processing circuit 6 comprises preferably a memory zone or a register zone, not represented, in which the result of the processing is stored. This memory zone can be accessed by the digital processing system 8 at a predetermined address. In a variant embodiment, not represented, the digital circuit 6 can also write results in a portion of the memory 5.

The digital processing system 8 can, according to the executed program, access either the data $D_1$–$D_N$ stored in the memory 5 or the results R delivered by the circuit 6 or both simultaneously. It accesses the results R of the digital processing circuit 6 preferably through the data lines of the bus 7 or, as mentioned, through interruption lines. For example, in the case when the processing circuit 6 effects an error detection or a detection of a specific event on the input signal, it is possible to modify by means of an interruption signal the running of the program executed by the digital processor 8 when an error or a particular configuration is indeed detected. The interruption signal R can possibly be generated even before the digital system accesses the corresponding data in the memory 5, and it is thus possible to modify the processing or displaying of these data when such an event is detected.

The digital processing circuit 6 accesses the data at the reduced frequency supplied by the demultiplexer 2. These data are demultiplexed, so that the digital circuit 6 must effect a processing in parallel on N digital words. FIG. 3 illustrates a possible embodiment, flexible but expensive, of a digital processing circuit 6. In this embodiment, each of the N words of m bits delivered by the demultiplexer 2 is processed by an autonomous processing system, in this example by one or several digital signal processsors (DSP) $60_1, 60_2, \ldots, 60_N$. In the most general case represented, each word is processed by a plurality of digital signal processors in series; it is however understood that according to the application and processing effected, a single signal processor by word of m bits can be used. Similarly, it is possible according to the application to use another element than a digital signal processor for processing each word, for example a polyvalent processor, any digital component or a specific integrated circuit (ASIC) for example.

On the diagram of FIG. 3, each component $60_1$ to $60_N$ processes a word while disregarding the processing operations effected by the other components. According to the application, it is however possible to connect the different processors in a network so that the component $60_i$ for example can access the data at the input and/or output of another component $60_j$.

The different components $60_1$ to $60_N$ determine results that are stored in the registers or in a memory zone, not represented, and connected to the bus 7. In the case of programmable components, for example digital processors, these components execute a program stored in a RAM or ROM, not represented. In a preferred embodiment, the contents of this memory can be modified by the digital processing system 8, through the bus 7. In this manner, the program executed by the digital processing system 8 can modify the processing operation effected by the processors 60 according to the needs of the application.

In the example of FIG. 3, the number of series of components 60 in parallel is equal to the demultiplexing factor N of the demultiplexer 2. It is however also possible to use a different number of series of components in parallel; for example, if the width m of the words converted by the digitizers 1 is eight bits, it is possible by using digital processors 60 at 16 bits to divide by two the number N of digital processors necessary for certain operations, or by four with processors at 32 bits. It is however obvious that only certain specific operations can be effected indifferently with N processors at m bits or N/2 processors at 2 m bits, and that the flexibility of the system is thus reduced when the number of processors is reduced.

FIG. 4 illustrates a variant embodiment of a digital processing circuit 6 that uses a gate array structure. Preferably, the circuit 6 is constituted by a gate array structure that can be programmed by the user, known under the name of FPGA (field programmable gate array). Numerous examples of circuits comprising such a structure are for example described in patent documents classified notably in the group H02K-19/177 of the international patent classification; these circuits will therefore not be described in further detail.

Each demultiplexed word of m bits is first stored in a corresponding register $61_1$ to $61_N$. According to the application, a suitable processing is effected by the element FPGA 62 that executes an appropriate algorithm implemented in wired form. The element 62 supplies a one or several bits result, preferably stored in a register, not represented, accessible by the processor 8 through the bus 7.

Preferably, the element 62 is of the type SRAM-FPGA. This component then executes a processing operation determined by an algorithm stored in a static RAM (SRAM), not represented, whose contents make it possible to reprogram the component 62. In a preferred embodiment of the invention, the digital processing system 8 can access in writing mode the contents of said SRAM through the bus 7, so as to modify the processing effected by the component 62 according to the needs of the application.

FIG. 5 illustrates an equivalent electric diagram of an extrema detector made by means of a gate array according to FIG. 4. The illustrated circuit is for example achieved by means of a specific program loaded in the SRAM memory (not represented) of a FPGA circuit 62; another program would allow another equivalent circuit to be obtained to effect a different processing of the demultiplexed data. In the illustrated circuit, a comparator at m bits $620_j$ compares the word of m bits stored in each corresponding register $61_j$ with the word in the next register $61_{j+1}$. The binary signal supplied by the comparator $620_j$ takes the logical state 1 if the sample value at the time $t_j$ contained in the register $61_j$ is greater than the sample value at the next time $t_{j+1}$, contained in the register $61_{j+1}$. In the contrary case, the comparator $620_j$ supplies a logical state 0. The signal supplied by the N−1 comparators 620 thus indicates the sign of the differential coefficient of the digital signal at the sampling time under consideration. A change of sign corresponds to a local extremum (maximum or minimum) of the signal; these sign changes are detected by an OR-exclusive gate array 621 each supplying at its output a signal that equals one only in the case of an extrema of the digital signal at the sampling time considered. The digital processing circuit 62 thus supplies in this case a N−2 bits signal, indicating to the digital processing system 8 the possible presence and the position of a local extrema in the digital signal.

The one skilled in the art will understand that other embodiments of the digital processing circuit 6 can be conceived in the framework of this invention so as to effect different operations of processing and/or analyzing digital data according to the application executed by the digital processor 8.

In particular, it is also possible to use a digital circuit 6 as look-up table for linearizing the input/output curve of the whole acquisition system.

What is claimed is:

1. Data acquisition system comprising at least one circuit for converting a high-frequency analog input signal into a plurality of digital signals for processing by a digital processing system including at least one digital processor comprising:

at least one m-bits digitizer, at least one demultiplexer for delivering in parallel N m-bits sample values supplied in series by said digitizer (1), at least one memory for storing the demultiplexed sample values, said memory being accessible by said digital processing system (8), at least one real time digital processing circuit for processing in real time said demultiplexed sample values, connected to the output of said demultiplexer and for supplying processed results to said digital processing system.

2. Data acquisition system according to claim 1, wherein the sampling frequency of said digitizer is greater than the external bus frequency of said digital processor.

3. Data acquisition system according to claim 2, wherein said real-time digital processing circuit comprises N processing systems in parallel.

4. Data acquisition system according to claim 3, wherein each processing system in parallel comprises at least one digital signal processor.

5. Data acquisition system according to claim 3, wherein the program executed by at least one of said processing systems in parallel can be modified by said digital processing system.

6. Data acquisition system according to claim 1, wherein said real time digital processing circuit comprises one or several circuits of the type gate array.

7. Data acquisition system according to claim 6, wherein said real time digital processing circuit comprises one or several circuits of the type field programmable gate array (FPGA).

8. Data acquisition system according to claim 7, wherein said real time digital processing circuit comprises one or several circuits of the type FPGA whose operation is determined by the contents of a RAM.

9. Data acquisition system according to claim 8, wherein said RAM can be accessed in writing by said digital processing system.

10. Data acquisition system according to claim 1, comprising a storage means capable of memorizing said results supplied by said processing circuit.

11. Data acquisition system according to claim 1, wherein said real time digital processing circuit supplies an interruption signal to said digital processing system.

12. Data acquisition system according to claim 1, wherein said real time digital processing circuit constitutes a digital filter.

13. Data acquisition system according to claim 1, wherein said real time digital processing circuit constitutes a detector of extrema.

14. Data acquisition system according to claim 1, wherein said real time digital processing circuit constitutes a linearizer of the transfer characteristic of the acquisition system.

15. Data acquisition system according to claim 1, wherein said memory is constituted by a double access memory accessible simultaneously by said digital processing system and by said demultiplexer.

16. Digital oscilloscope according to claim 1.

* * * * *